United States Patent

[11] 3,624,147

[72] Inventors Reginald David;
Jean Estienne, both of Lyon, France
[21] Appl. No. 826,298
[22] Filed May 20, 1969
[45] Patented Nov. 30, 1971
[73] Assignee Rhone-Poulenc S.A.
Paris, France
[32] Priority May 21, 1968
[33] France
[31] 152605

[54] PREPARATION OF ACRYLIC ACID
7 Claims, No Drawings
[52] U.S. Cl. .................................................... 260/533 N,
260/604 AC
[51] Int. Cl. ..................................................... C07c 57/04
[50] Field of Search .......................................... 260/533 N,
604 AC

[56] References Cited
FOREIGN PATENTS
1,428,957   3/1965   France .......................... 260/604 AC
904,304   8/1962   United Kingdom .......... 260/533 N Primary Examiner—Lorraine A. Weinberger
Assistant Examiner—Richard D. Kelly
Attorney—Cushman, Darby & Cushman

ABSTRACT: Acrylic acid is prepared by oxidizing propylene with air in the presence of water and a platinum, rhodium, rutheniun or palladium metal catalyst at a temperature above 50° C. and a pressure exceeding 5 bars gauge. A supported palladium catalyst is preferred. Acrylic acid is obtained in about 60 percent yield based on propylene converted and the small amounts of acrolein obtained may be oxidized to acrylic acid.

PREPARATION OF ACRYLIC ACID

The present invention relates to a process for the preparation of acrylic acid by the oxidation of propylene.

Several processes for the oxidation of propylene to acrylic acid by air or by oxygen in the gas phase have been described. The most commonly used catalysts are based on some form of molybdenum, for example the trioxide, which is frequently associated with an oxide of a polyvalent metal such as cobalt, nickel or tin. These catalysts are generally used in the presence of acid promoters such as boron, phosphorus, vanadium, tellurium or arsenic oxide. Such processes have been described in British Pat. specifications Nos. 893,077, 961,468, 967,241 and 971,666. Regardless of the catalyst used, high temperatures, of the order of 300° to 700° C., are required. Further more, as emerges from French Pat. No. 1,433,572, the catalyst must meet certain conditions as to composition so that acrylic acid is formed preferentially and at the expense of the acrolein which is formed in varying amounts during the oxidation of propylene. Thus the catalyst has to be carefully prepared.

The present invention provides a process for preparing acrylic acid which comprises oxidizing propylene with molecular oxygen or a gas containing molecular oxygen in the presence of water and of a noble metal of Group VIII of the Periodic Table at a temperature above 50° C., and under a pressure exceeding 5 bars gauge.

Suitable noble metals include platinum, rhodium, ruthenium, and particularly palladium. The metal may be used in a finely divided state or can be deposited on a carrier such as for example alumina, silica gel, aluminum oxide or aluminum silicate, pumice, active charcoal or bentonite. In this latter case it is advantageous to use catalysts containing 1 to 20 percent by weight of metal based on the total weight of carrier and metal; these limits are, however, not essential. The amount of catalyst to be used may vary within wide limits depending on the reaction conditions. Thus the amount of catalyst expressed as metal may vary from 0.01 to 10 percent by weight based on the reaction medium.

The reaction temperature may vary within wide limits but the high temperatures required in the previously known processes are not necessary. In general temperatures between 50° and 200° C., and preferably between 70° and 120 C. are suitable.

The process is carried out under gauge pressures greater than 5 bars (i.e. an absolute pressure greater than 6 bars), preferably 20 to 150 bars gauge. The pressure has no critical upper limit but for technical and economic reasons, very high pressures are not of interest.

The relative proportions of propylene and oxygen may vary widely but for safety reasons explosive mixtures must be avoided and therefore in practice a large excess of propylene is usually used.

The process of this invention may be carried out continuously or discontinuously in any type of apparatus usually used for such a process. As well as the acrylic acid obtained in about 60 percent yield based on the propylene converted, acrolein in less than 10 percent yield is formed. This acrolein, after separation from the acrylic acid, may be oxidised to acrylic acid by the usual methods. The unconverted propylene can be recycled to the oxidation zone.

The examples which follow illustrate the invention.

EXAMPLE 1

Two-hundred cm.$^3$ of water and 10.6 g. of a catalyst consisting of palladium deposited on carbon block (palladium content: 10 percent are introduced into a 1 litre stainless steel autoclave. The apparatus is closed and flushed with nitrogen, and then introduced into an oven arranged on a vibratory agitator and charged with 42.6 g. of propylene (corresponding to a pressure of 11 bars).

The temperature of the contents of the autoclave is raised to 90° C., with agitation, in 1 hour 40 minutes. The pressure is then 30 bars. Air is introduced until a pressure of 100 bars (corresponding to an air pressure of 70 bars) is established. After 2 hours 15 minutes the pressure becomes stable at 84 bars. The agitation is stopped and the contents of the autoclave are cooled to 20° C. The gas is removed from the apparatus through a bubbler containing hydroxylamine hydrochloride and then through a bubbler containing 5 N potassium hydroxide solution.

The reaction medium is withdrawn from the autoclave, and to it the 150 cm3 of water used to rinse the apparatus are added. This mixture is distilled under normal pressure and 30 cm$^3$ of a fraction boiling below 99° C., which consists of an aqueous distillate containing various carbonyl compounds, are collected. The acid-containing residue is filtered to remove the catalyst.

Analysis and determination of the products contained in the aqueous distillate, in the distillation residue and in the traps gave the following results:

| | |
|---|---|
| $CO_2$ | $6.57 \times 10^{-2}$ mol (1.47 l.) |
| Acrolein | $0.90 \times 10^{-2}$ mol (0.5 g.) |
| Acrylic acid | $7.83 \times 10^{-2}$ mol (5.64 g.) |

The yields, based on propylene converted during the reaction, are 16.3 percent $CO_2$, 6.7 percent acrolein and 58.4 percent acrylic acid. The remainder of the propylene has been converted to various carbonyl and carboxylic compounds.

EXAMPLES 2-4

The procedure described in example 1 is followed except that an air pressure of 50 bars is used. By varying the temperature the results shown in the table below were obtained. The yields are expressed based on the propylene converted.

| Examples | Temperature in ° C. | Duration | Propylene introduced in g. | Acrolein g. | Acrolein Yield, percent | Acrylic acid g. | Acrylic acid Yield, percent | $CO_2$ g. | $CO_2$ Yield, percent |
|---|---|---|---|---|---|---|---|---|---|
| 2 | 80 | 3 hrs. 45 min | 41.5 | 0.49 | 8.7 | 4.17 | 58.3 | 1.09 | 16.3 |
| 3 | 90 | 1 hr. 30 min | 41 | 0.47 | 8.9 | 3.71 | 54.7 | 1.20 | 18.9 |
| 4 | 100 | 1 hr | 42.5 | 0.23 | 5 | 3.40 | 56 | 1.26 | 22.2 |

EXAMPLES 5 and 6

The procedure described in example 1 is followed using a temperature of 90° C., but varying the air pressure; the following results were obtained:

| Examples | Pressure of air in bars | Duration | Propylene introduced in g. | Acrolein g. | Acrolein Yield, percent | Acrylic acid g. | Acrylic acid Yield, percent | $CO^2$ l. | $CO^2$ Yield, percent |
|---|---|---|---|---|---|---|---|---|---|
| 5 | 50 | 1 hr. 30 min | 41 | 0.47 | 8.9 | 3.71 | 54.7 | 1.20 | 18.9 |
| 6 | 60 | 2 hrs | 43.2 | 0.46 | 6.9 | 4.62 | 53.5 | 1.44 | 17.8 |

EXAMPLE 7

The same conditions as those described in example 1 are used except that the catalyst on carbon black is replaced by a catalyst on alumina, containing 10 percent by weight of palladium metal.

The following results were obtained:

| | |
|---|---|
| Acrylic acid | $7.65 \times 10^{-2}$ mol (5.50 g.) |
| Acrolein | $0.86 \times 10^{-2}$ mol (0.48 g.) |
| $CO_2$ | $7.54 \times 10^{-2}$ mol (1.69 l.) |

The yields, based on the propylene converted during the reaction, are 60.7 percent acrylic acid, 6.8 percent acrolein and 20 percent $CO_2$.

EXAMPLES 8 TO 11

The procedure described in Example 1 is followed using a series of catalysts. The results obtained are shown in the table below:

| Example | Catalyst | Duration | Degree of conversion of propylene, percent | Acrolein Mol $\times 10^{-2}$ | Acrolein Yield, percent [1] | Acrylic acid g. | Acrylic acid Yield, percent [1] | Saturated acids Mol $\times 10^{-2}$ | Saturated acids Yield, percent | $CO_2$ Litres | $CO_2$ Yield, percent |
|---|---|---|---|---|---|---|---|---|---|---|---|
| 8 | 10% Pd on silica gel [2] | 3 hrs. 15 min | 16.9 | 1 | 6 | 8.17 | 67.7 | 1.50 | 8.9 | 1.52 | 13.5 |
| 9 | 10% Pd on silica-alumina [2] | 4 hrs. 15 min | 12.1 | 0.94 | 7.2 | 6.21 | 66 | 1.01 | 7.7 | 1.38 | 15.5 |
| 10 | 7% Pd on silica gel [2] | 1 hr. 30 min | 13.5 | 0.42 | 3.1 | 5.74 | 59 | 1.8 | 13.3 | 2 | 21.9 |
| 11 | Pd without carrier [3] | 2 hrs. 15 min | 13.1 | 0.80 | 5.7 | 5.65 | 56.2 | 2.05 | 14.7 | 1.75 | 18.6 |

[1] Based on the propylene converted.
[2] 1.06 g. of Pd metal are used, as catalyst.
[3] 3.18 g. of Pd metal are used as catalyst.

We claim:

1. A process for preparing acrylic acid which consists essentially of oxidizing propylene with molecular oxygen or a gas containing molecular oxygen in the presence of water and of platinum, rhodium, ruthenium or palladium metal catalyst at a temperature above 50° C., and under a pressure exceeding 5 bars gauge.

2. A process according to claim 1 wherein the metal catalyst is deposited on a carrier.

3. A process according to claim 2 wherein 1 to 20 percent by weight of metal based on the total weight of metal and carrier is used.

4. A process according to claim 1 wherein 0.01 to 10 percent by weight of the metal catalyst based on the reaction medium is used.

5. A process according to claim 1 wherein the temperature is 50° to 200° C.

6. A process according to claim 5 wherein the temperature is 70° to 120° C.

7. A process according to claim 1 wherein the pressure is 20 to 150 bars.

* * * * *